（12) United States Patent
Estrada et al.

(10) Patent No.: US 9,843,474 B2
(45) Date of Patent: Dec. 12, 2017

(54) TELEMETRY ADAPTATION

(71) Applicant: Intel Corporation, Santa Clara, CA (US)

(72) Inventors: Giovani Estrada, Dublin (IE); Victor Bayon-Molino, Maynooth (IE); Michael J. McGrath, Virginia (IE); Joseph Butler, Stamullen (IE)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 14/998,176

(22) Filed: Dec. 23, 2015

(65) Prior Publication Data

US 2017/0187570 A1    Jun. 29, 2017

(51) Int. Cl.
*H04L 12/24* (2006.01)
(52) U.S. Cl.
CPC ...... *H04L 41/0695* (2013.01); *H04L 41/0631* (2013.01)
(58) Field of Classification Search
USPC ................... 709/224, 226, 203, 223
See application file for complete search history.

(56) References Cited

U.S. PATENT DOCUMENTS

| | | | |
|---|---|---|---|
| 6,263,055 B1 | 7/2001 | Garland et al. | |
| 7,577,542 B2 | 8/2009 | Vacar et al. | |
| 8,898,178 B2 * | 11/2014 | Kyomasu | G06F 8/61 707/754 |
| 9,152,820 B1 * | 10/2015 | Pauley, Jr. | G06F 21/6263 |
| 2004/0215757 A1 * | 10/2004 | Butler | H04L 67/18 709/223 |
| 2006/0190602 A1 * | 8/2006 | Canali | H04L 29/06 709/226 |
| 2007/0169192 A1 | 7/2007 | Main et al. | |
| 2007/0294591 A1 | 12/2007 | Usynin et al. | |
| 2008/0163333 A1 | 7/2008 | Kasralikar | |

(Continued)

FOREIGN PATENT DOCUMENTS

WO    WO 2014/127812 A1    8/2014

OTHER PUBLICATIONS

Cisco, "Telemetry and Anomaly Detection", published Jun. 26, 2008; http://www.ciscopress.com/articles/article.asp?p=791595 &seqNum=2; retrieved Mar. 23, 2016, 17 pages.

(Continued)

*Primary Examiner* — Jude Jean Gilles
(74) *Attorney, Agent, or Firm* — Schwabe, Williamson & Wyatt, P.C.

(57) ABSTRACT

Methods, systems, and storage media for telemetry adaptation are disclosed herein. In an embodiment, a networking device may include a data collector agent module to receive measurement data from measurement sources according to an initial telemetry policy and to provide the measurement data to the one or more servers of the monitoring system. The networking device may include an anomaly detection module to receive measurement data from the data collector agent module, to detect an anomaly in the measurement data, and to provide an indication of the anomaly to the data collector agent module for the data collector agent module to provide a first modified telemetry policy for the measurement sources.

24 Claims, 6 Drawing Sheets

(56) References Cited

U.S. PATENT DOCUMENTS

| | | | |
|---|---|---|---|
| 2008/0214186 A1* | 9/2008 | Bizzarri | H04W 24/08 455/425 |
| 2009/0138753 A1* | 5/2009 | Tameshige | G06F 11/1662 714/4.1 |
| 2010/0229023 A1 | 9/2010 | Gross et al. | |
| 2011/0289440 A1* | 11/2011 | Carter | G06F 11/3688 715/771 |
| 2014/0153396 A1 | 6/2014 | Gopalan et al. | |
| 2014/0245377 A1 | 8/2014 | Faltyn et al. | |
| 2015/0046512 A1 | 2/2015 | Ashby et al. | |
| 2015/0124711 A1 | 5/2015 | Krinsky et al. | |

OTHER PUBLICATIONS

Cisco, "Context-Aware Mobility Solution", Released 2012; http://www.cisco.com/c/en/us/solutions/collateral/borderless-networks/context-aware-mobility-solution/white_paper_c11-476796. html; retrieved Mar. 23, 2016, 12 pages.

Cisco, "Cisco ASA CX delivers context-aware security", Released Feb. 2012; http://www.cisco.com/c/en/us/products/collateral/security/asa-5500-series-next-generation-firewalls/white_paper_c11-700240.html; retrieved Mar. 24, 2016, 12 pages.

International Search Report and Written Opinion dated Feb. 20, 2017 for International Application No. PCT/US2016/062754, 13 pages.

* cited by examiner

TELEMETRY ADAPTATION

FIELD

The present disclosure relates to automated communication of measurement data, sometimes referred to as telemetry, and in particular, to apparatuses, methods and storage media associated with telemetry adaptation.

BACKGROUND

Telemetry may include an automated communication process in which measurement data is collected at a source device and transmitted to a centralized location for processing, analysis and/or visualization. Telemetry may be employed in a range of fields such as, but not limited to, data centers, network monitoring, remote sensing, sensor networks, Machine-to-Machine systems (M2M), the Internet of Things (IoT), etc. For example, the Internet of Things ("IoT") includes a network of objects or "things", each of which is embedded with hardware or software that enable connectivity to the Internet. An object, device, sensor, or "thing" (also referred to as an "IoT device") that is connected to a network may provide information to a manufacturer, operator, or other connected devices or clients in order to track information from or about the object or to obtain or provide services. IoT devices may be deployed in homes, offices, manufacturing facilities, and the natural environment. In a data center, for example, systems or processors or other devices used in the operation of the data center may provide measurement data relating to, for example, performance, usage, and/or operability of the devices in connection with monitoring operation of data center components.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

In the following detailed description, reference is made to the accompanying drawings which form a part hereof wherein like numerals designate like parts throughout, and in which is shown by way of illustrated embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrases "A or B" and "A and/or B" mean (A), (B), or (A and B). For the purposes of the present disclosure, the phrase "A, B, and/or C" means (A), (B), (C), (A and B), (A and C), (B and C), or (A, B, and C).

Various operations may be described as multiple discrete actions or operations in turn, in a manner that is most helpful in understanding the claimed subject matter. However, the order of description should not be construed to imply that the various operations are necessarily order-dependent. In particular, these operations might not be performed in the order of presentation. Operations described may be performed in a different order than the described embodiments. Various additional operations might be performed, or described operations might be omitted in additional embodiments.

The description may use the phrases "in an embodiment", "in an implementation", or in "embodiments" or "implementations", which may each refer to one or more of the same or different embodiments. Furthermore, the terms "comprising," "including," "having," and the like, as used with respect to embodiments of the present disclosure, are synonymous.

As used, herein, the term "logic" and "module" may refer to, be part of, or include any or any combination of an Application Specific Integrated Circuit (ASIC), an electronic circuit, a processor (shared, dedicated, or group) or memory (shared, dedicated, or group) that execute one or more software or firmware programs, a combinational logic circuit, or other suitable components that provide the described functionality.

Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like: When a process corresponds to a function, its termination may correspond to a return of the function to the calling function a main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "network element", may be considered synonymous to or referred to as a networked computer, networking hardware, network equipment, router, switch, hub, bridge, gateway, or other like device. The term "network element" may describe a physical computing device of a network with wired or wireless communication links. Furthermore, the term "network element" may describe equipment that provides radio baseband functions for data or voice connectivity between a network and one or more users.

Example embodiments disclosed herein include systems and methods relating to telemetry, including adapting telemetry in response to changes in measurement data received in connection with the telemetry. Measurement data may be provided by any of a wide variety of source devices, such as devices or objects that are used in or associated with data centers, network monitoring, remote sensing, sensor networks, Machine-to-Machine systems (M2M), the Internet of Things (IoT), etc. The source devices may be included in a network and may include or be embedded in or with hardware and/or software components that enable the source devices to communicate over a communications network, which may include any or all of a local network, a wide area network, the Internet, etc., over wired and/or wireless connections. The source devices may provide measurement data that may relate to generally any measurable feature of or characteristic measurable by a source device.

Figure 1:
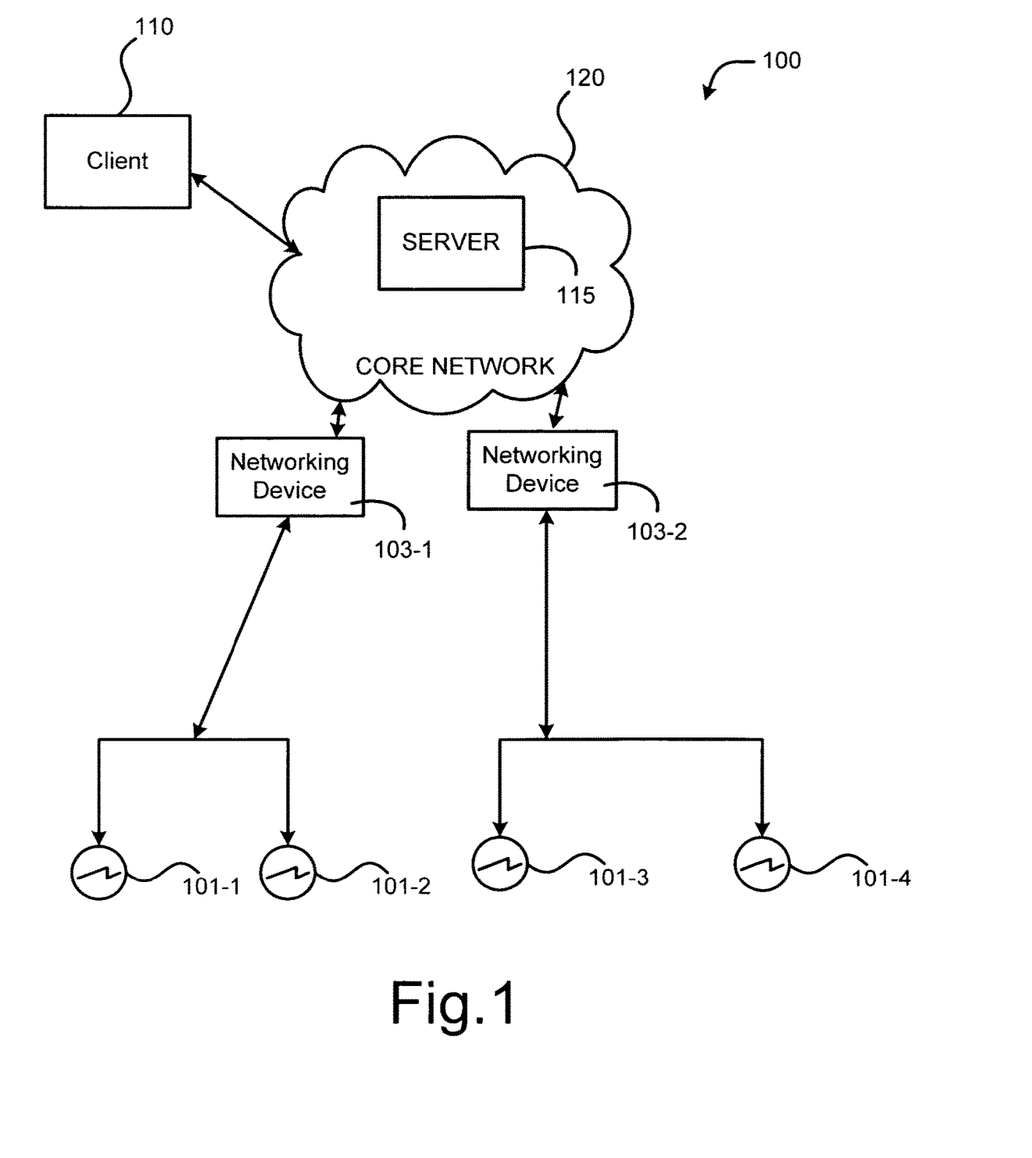
FIG. 1 illustrates a communications network in which various example embodiments described in the present disclosure may be implemented.

FIG. 1 shows a communications network 100 in accordance with various embodiments as an operating environment. As shown in FIG. 1, communications network 100 may include source devices 101-1 to 101-4 (collectively referred to as "devices 101"), networking devices 103-1 and 103-2, a client device 110, and one or more servers 115 (only one shown) within a system core network 120. Core network 120 may be any network that allows computers to exchange data. Core network 120 may include one or more network elements (not shown) capable of physically or logically connecting computers. The core network 120 may include any appropriate network, including an intranet, the Internet, a cellular network, a local area network (LAN), a personal network or any other such network or combination thereof. Components used for such a system can depend at least in part upon the type of network and/or environment selected. Communication over the network may be enabled by wired or wireless connections, and combinations thereof.

Source devices 101 may be any object, device, sensor, or "thing" that includes or is embedded with hardware and/or software components that enable the object, device, sensor, or "thing" to communicate with another device (e.g., client device 110, server 115, another source device 101, etc.) over a network (e.g., network 100), typically with little or no user intervention. Source devices 101 may include one or more processors, one or more memory devices, and a transmitter/receiver (or alternatively, a transceiver) for wired or wireless communication. Communications with source devices 101 may include data packets that include unique identifiers associated with the respective source devices 101. In various embodiments, the unique identifier (or alternatively, "identifier" or "identification information") may include a universally unique identifier (UUID), an electronic product code (EPC), a media access control address (MAC address), an Internet Protocol (IP) address, an Apache QPID address, and/or any other like identification information.

Networking device 103 may communicate with source devices 101 and provide communication services between source devices 101 and other devices (e.g., server 115) operating within core network 120. In particular, networking device 103 may include telemetry adaptation of the present disclosure. Networking device 103 may include a connection interface to establish and maintain a connection 125 to source devices 101 and another connection interface to establish and maintain a connection 130 to core network 120, including server 115. Networking device 103 may include any or all of one or more processors, one or more network interfaces, one or more transmitters/receivers connected to one or more antennas, and a computer readable medium. The one or more transmitters/receivers and/or network interface may be configured to transmit/receive data signals to/from one or more source devices 101 and devices (e.g., server 115) operating within core network 120.

The networking device 103 may be a wired or wireless access point, a router, switch, hub, gateway, and/or any other like network device that allows source devices 101 to connect to core network 120 and may be referred to as an "edge device," in reference to being located at an "edge" of core network 120. The networking device 103 may process and/or route data packets according to one or more communications protocols, such as Ethernet, Point-to-Point Protocol (PPP), High Level Data Link Control (HDLC), Internet Protocol version 4 (IPv4), Internet Protocol version 6 (IPv6), and/or any other like protocols. The networking device 103 may employ one or more network interfaces in order to allow source devices 101 to connect to core network 120, such as Ethernet, Fibre Channel, G.hn or ITU-T, 802.11 or Wi-Fi, Bluetooth, and/or any other like network connection interfaces.

Measurement data obtained by a source device 101 (e.g., captured and recorded) may be sent by the source device 101 to networking device 103, to be passed on to server 115 for processing, analysis and/or visualization. Server 115 may operate as or in connection with a system for monitoring the measurement data provided by the source devices 101 and may include or be in communication with one or more data storage devices. The source devices 101 may be configured to obtain and report measurement data on a periodic or cyclical basis, or based on a desired event that is captured and recorded by a source device 101.

FIG. 1 shows four devices 101, two networking devices 103-1 and 103-2 (referred to collectively as networking devices 103), one client device 110, and server 115. According to various embodiments, any number of devices, any number of networking devices, any number of client devices, and/or any number of servers may be present. Additionally, in some embodiments, server 115 may be a virtual machine, and/or may be provided as part of a cloud computing service. Thus, the depiction of the illustrative communications network 100 in FIG. 1 should be taken as being illustrative in nature, and not limited to the scope of the disclosure.

Figure 2:
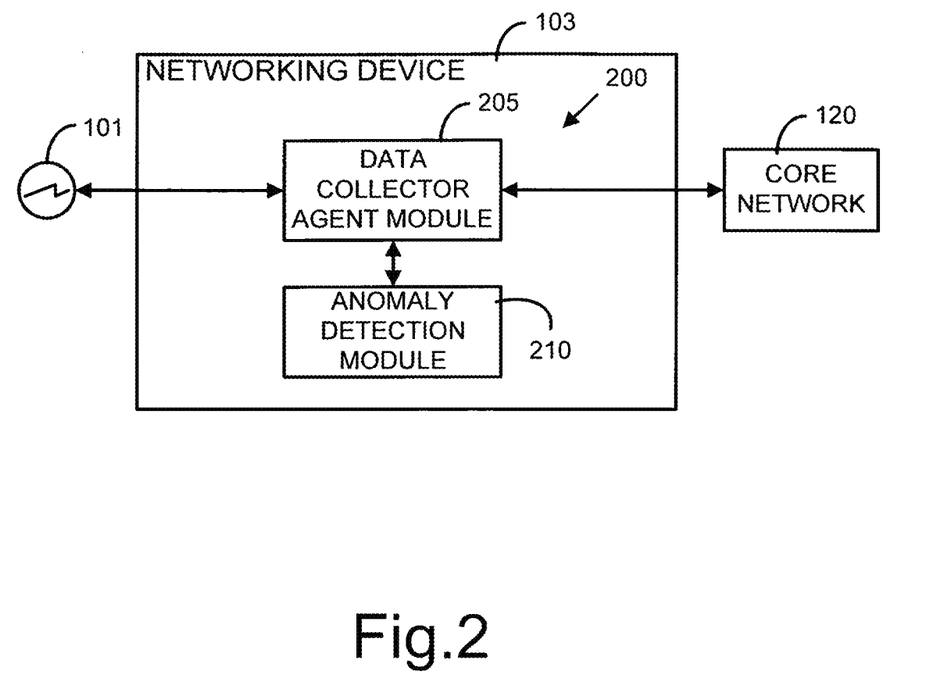
FIG. 2 is a block diagram of a telemetry adaptation apparatus or system.

FIG. 2 is a block diagram of a telemetry adaptation apparatus or system 200 that may be included in or associated with networking device 103 at an edge of core network 120, for example. Telemetry adaptation system 200 may communicate with source devices 101 and provide communication between source devices 101 and devices operating within core network 120, such as server 115. Telemetry adaptation system 200 may include a data collector agent module 205 (to be operated by one or more processors (not shown) of networking device 103) to receive measurement data from the source devices 101 and provide the measurement data to server 115, such as for monitoring of the measurement data. Data collector agent module 205 may receive measurement data from the source devices 101 according to a telemetry policy that, for example, data collector agent module 205 may provide to source devices 101 and according to which source devices 101 provide the measurement data. For example, the telemetry policy may specify features, characteristics, circumstances (i.e., "metrics") for which source devices 101 are to provide measurement data to be monitored, and may specify a frequency or timing at which measurement data are to be provided. The telemetry policy may also specify other monitoring factors, such as a security policy, for example. In embodiments, data collector agent module 205 may receive an initial telemetry policy from server 115.

Telemetry adaptation system 200 may also include an anomaly detection module 210 (to be operated by one or more processors (not shown) of networking device 103) that may receive measurement data from data collector agent module 205 to detect an anomaly in the measurement data. Anomaly detection module 210 may operate as a local filter to identify measurement data outliers and to act in response to them. Data outliers may be considered to be data values that are outside threshold or guideline values, for example, and may vary in different applications, for different data types, in different circumstances, etc. The threshold or guideline values may be preset or may be determined relative to other data values in any manner and may include fixed values and/or statistical, proportional, probabilistic variations, etc. This local filtering may identify measurement data than exhibits faulty or irregular behavior and may provide for system improvement or correction, such as with respect to key performance indicators (KPIs) or service level agreements (SLAs). In embodiments, anomaly detection module 210 may count the number of outliers within certain window of observations or time, or the number of failed attempts to read a sensor. Upon detection of an anomaly in the measurement data, anomaly detection module 210 may provide an indication of the anomaly to the data collector agent module 205, which may generate and provide to source devices 101 a modified telemetry policy.

The modified telemetry policy may direct one or more of the source devices 101 to provide different measurement data or to provide measurement data on a different schedule. For example, the modified telemetry policy may direct one or more of the source devices 101 to provide measurement data more frequently or to include measurement data relating to additional characteristics, conditions or features, based upon the anomaly detected by anomaly detection module 210. The modified telemetry policy may be directed to obtaining additional measurement data from which to identify or characterize a source or cause of the anomalous measurement data. As a result, telemetry adaptation system 200 of edge networking device 103 may dynamically adapt a telemetry policy for obtaining measurement data from source devices 101 according to circumstances, conditions, or results indicated by the measurement data.

Data collector agent module 205 may provide the measurement data to server 115 in a raw form, substantially as received from source devices 101, or may provide the measurement data to server 115 in a pre-processed form. In the pre-processed form, data collector agent module 205 may provide pre-processing of the measurement data, which may include computing averages, medians, or percentiles of the measurement data or providing pre-defined groupings or summaries (e.g., five number or reading summaries), for example.

In connection with an anomaly identified by anomaly detection module 210, data collector module 205 may request from server 115 an analysis of the measurement data relating to or including the anomaly to identify a cause of the anomaly. In embodiments, the requested analysis may include a root cause analysis of the measurement data relating to the anomaly. Data collector agent module 205 may receive from server 115 a server-modified telemetry policy to receive measurement data from the source devices 101 according to the server-modified telemetry policy and to provide the received measurement data to the server 115. In embodiments, server 115 may provide the server-modified telemetry policy to collector agent module 205 in accordance with the analysis by server 115 of the measurement data relating to or including the anomaly.

Figure 3:
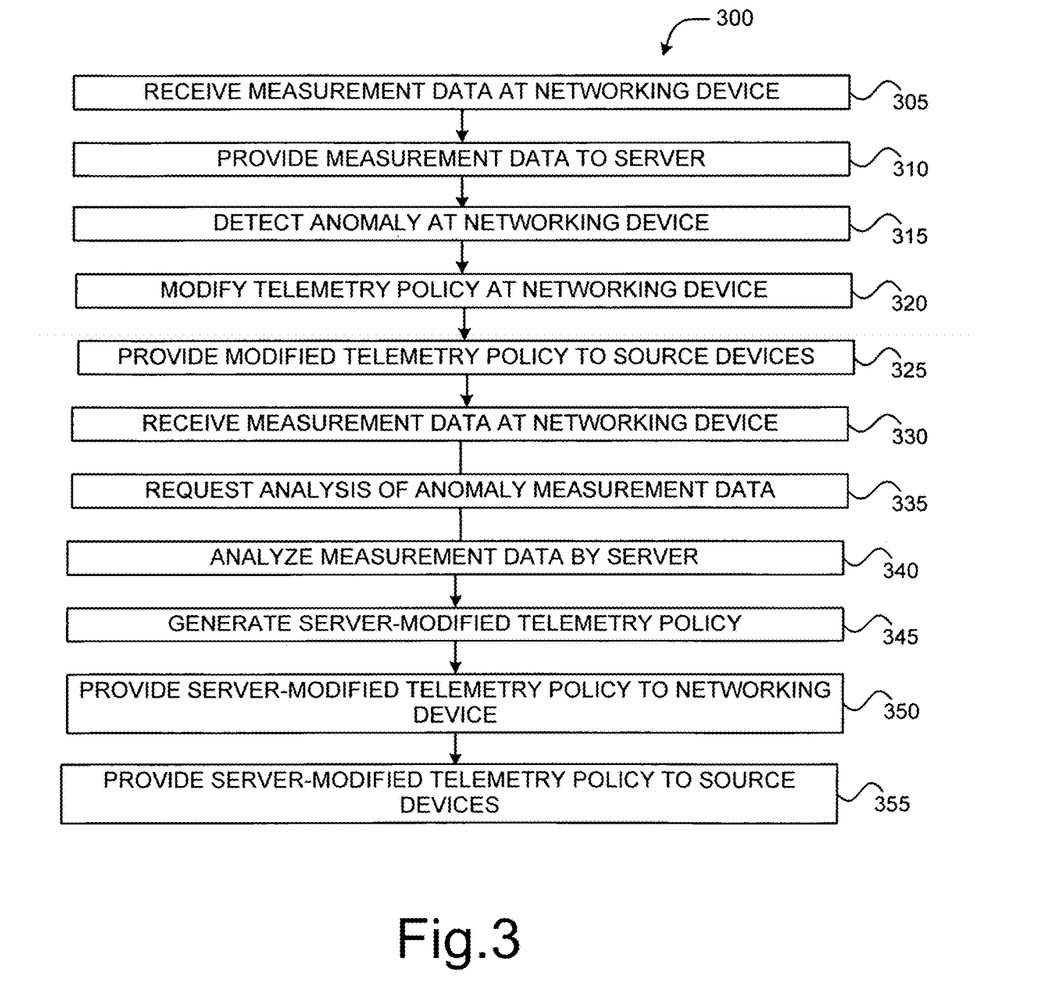
FIG. 3 is a flowchart illustrating an example a process of telemetry adaptation.

FIG. 3 is a flowchart illustrating an example a process 300 of telemetry adaptation, according to some embodiments. For illustrative purposes, the operations of process 300 will be described as being performed by networking device 103 and server 115, in which networking device 103 may be located at an edge of a core network 120 and may include telemetry adaptation system 200. However, it should be noted that other computing devices may operate the process 300. While particular examples and orders of operations are illustrated in FIG. 3, in various embodiments, these operations may be re-ordered, separated into additional operations, combined, or omitted altogether.

Prior to operation of process 300, a telemetry initialization may be performed. Telemetry initialization may include an initial telemetry policy being provided to telemetry adaptation system 200 by server 115, and telemetry adaptation system 200 providing the initial telemetry policy to source devices 101.

At operation 305, measurement data from one or more source devices may be received at a networking device according to an initial telemetry policy.

At operation 310, the measurement data may be provided by the networking device to one or more servers of a system in accordance with the telemetry policy.

At operation 315, an anomaly in the measurement data may be detected at the networking device.

At operation 320, a modified telemetry policy may be generated at the networking device.

At operation 325, the modified telemetry policy may be provided to the source devices.

At operation 330, measurement data from one or more source devices may be received at a networking device according to the modified telemetry policy.

At operation 335, the networking device may request analysis of the anomaly measurement data by the server. In embodiments, the analysis may include a root cause analysis of the anomaly.

At operation 340, measurement data may be analyzed by the server. In embodiments, analysis of the measurement data by the server may include comparing measurement data from before detection of the anomaly with measurement data from before detection of the anomaly.

At operation 345, a server-modified telemetry policy may be generated at the server.

At operation 350, the server-modified telemetry policy may be provided from the server the networking device.

At operation 355, the server-modified telemetry policy may be provided by the networking device to the source devices.

Figure 4:
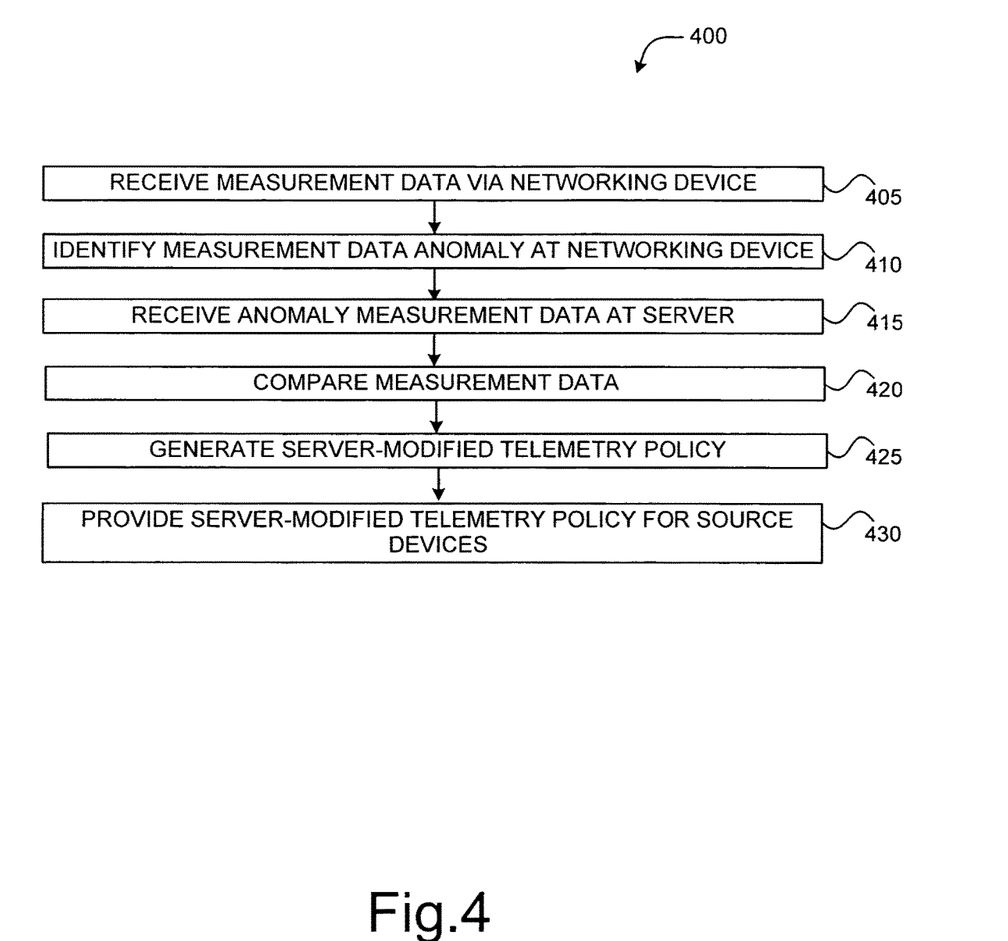
FIG. 4 is a flowchart illustrating an example a process of telemetry adaptation.

FIG. 4 is a flowchart illustrating an example a process 400 of telemetry adaptation. For illustrative purposes, the operations of process 400 will be described as being performed by and server 115.

At operation 405, the server receives measurement data from source devices via a networking device.

At operation 410, the networking device detects an anomaly in the measurement data.

At operation 415, the server receives measurement data associated with the anomaly.

At operation 420, the server compares the measurement data associated with the anomaly with prior measurement data received before the anomaly.

At operation 425, the server generates a server-generated modified telemetry policy. For example, server-generated modified telemetry policy may be generated in accordance with the comparison between the measurement data associated with the anomaly with prior measurement data received before the anomaly and may be directed to correcting or obtaining additional measurement data regarding the anomaly.

At operation 430, the server provides the server-generated modified telemetry policy to the networking device for application to the source devices.

In embodiments, energy consumption and network bandwidth may be conserved by applying telemetry policies in a hierarchical manner. Measurement data collected at maximum resolution may utilize greater resources, including energy consumption and network bandwidth. For example, full resolution data measurements may include extensive metrics collected at a maximum sensing frequency.

Figure 5:
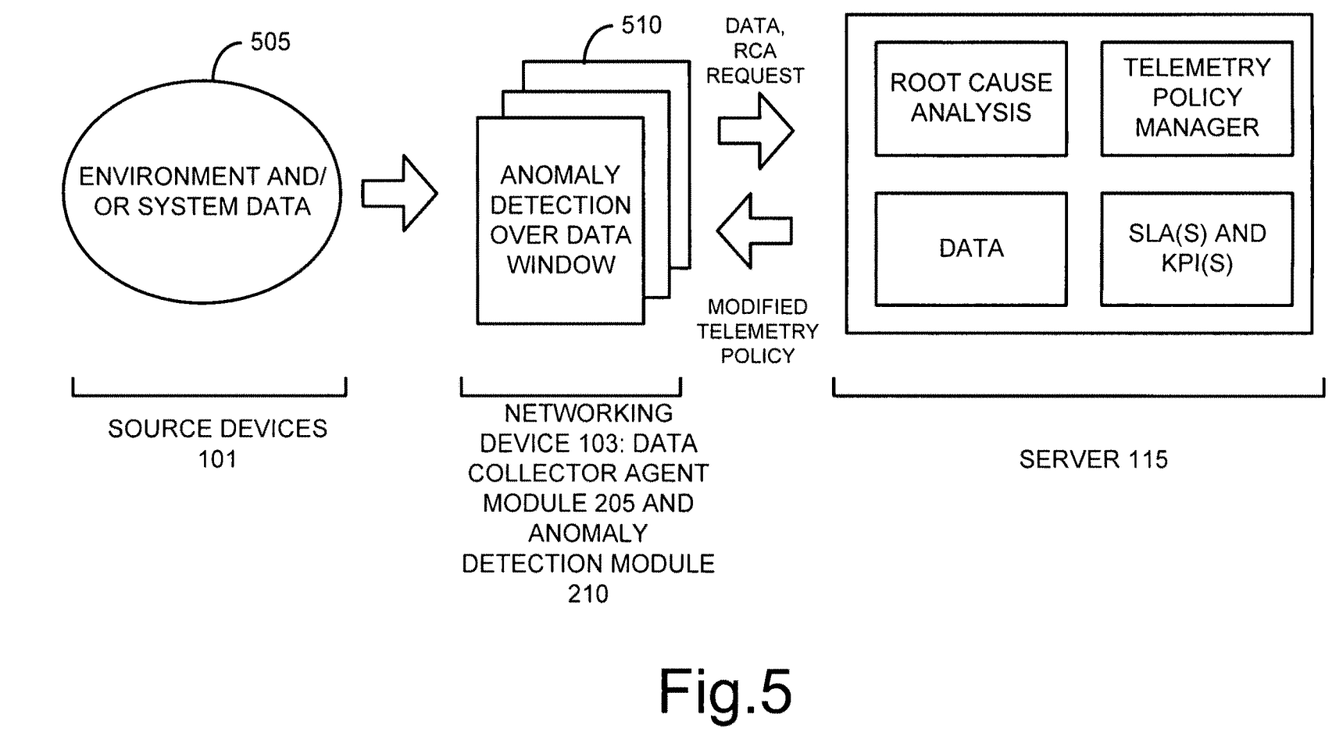
FIG. 5 is an information flow diagram illustrating embodiments described herein.

FIG. 5 is an information flow diagram illustrating embodiments described herein. Source devices 101 may provide environment and/or system data 505 (e.g., metrics or measurements) to networking device 103 according to a telemetry policy. Data collector module 205 may receive data 505, and anomaly detection module 210 may perform anomaly detection 510 over groupings or windows of the data 505. Data collector module 205 may modify the telemetry policy according to detected anomalies, and may provide data 505 to server 115. Data collector module 205 may provide to server 115 a request for root cause analysis of one or more anomalies, and server 115 may perform a root cause analysis of the one or more anomalies in a hierarchical manner. In accordance with analysis of the one or more anomalies, server 115 may employ a telemetry policy manager and/or KPIs or SLAs to provide to network device 103 a proposed modified telemetry policy.

Accordingly, embodiments may provide context-aware, edge-based telemetry adaptation, which may be responsive to equipment and/or environmental conditions. Adaptation may include, for example, any or all of: (i) increasing or decreasing the frequency at which metrics may be sampled, measured, and/or dispatched, or (ii) increasing or decreasing the metrics or numbers of metrics to be measured or monitored or (iii) requesting a root-cause-analysis from other upstream supervisory entities. Such embodiments may improve resource management and metric monitoring related to complex and large-scale system deployments, and may increase resilience to adverse operating conditions and allow fault-tolerant orchestration of distributed sensors and/or source devices. Edge based adaption may also improve energy consumption, network bandwidth and backend (e.g., server) processing resources allocated to telemetry.

Figure 6:
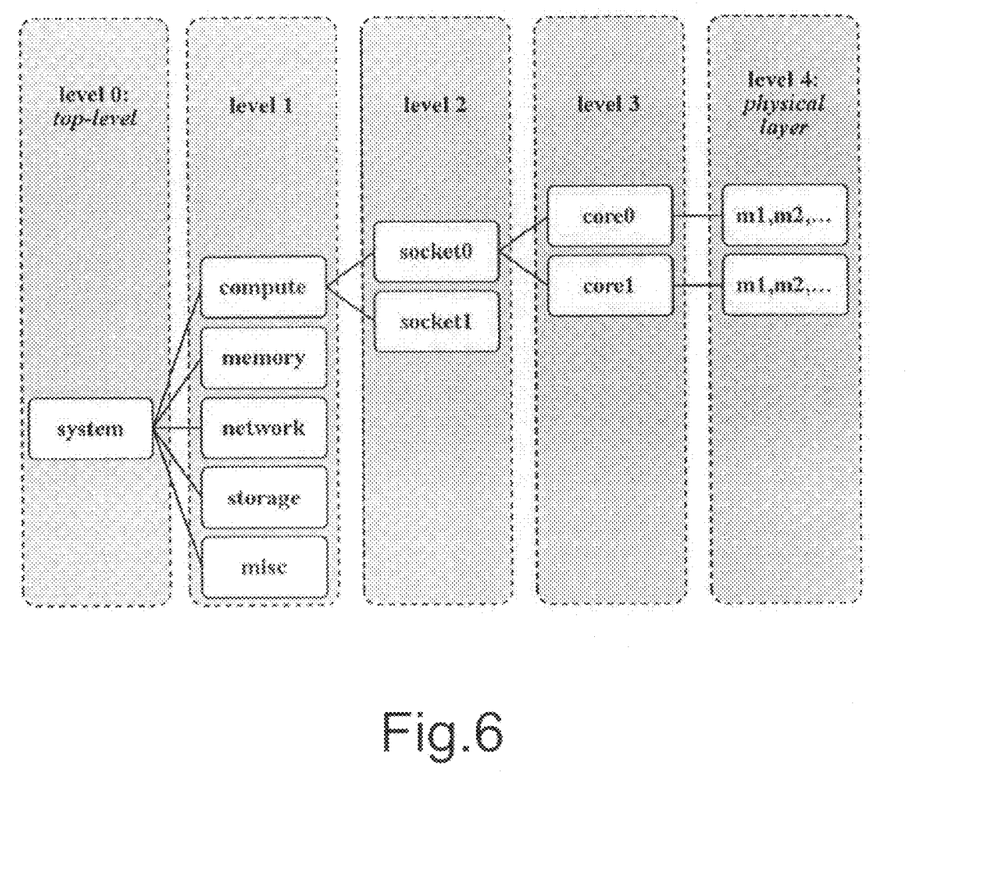
FIG. 6 is a diagram illustrating hierarchical aspects of measurement data or metrics.

FIG. 6 is a diagram illustrating hierarchical aspects of measurement data or metrics, which may be accessed by telemetry policies in a hierarchical manner such as in generating telemetry policies to obtain measurement data to characterize, resolve or correct an identified anomaly. Telemetry policies to access measurement data or metrics hierarchically may be generated by data collector agent module 205 of networking device 103 or by server 115.

In the illustration of FIG. 6, a top level 0 may correspond to a system level, which may include one or more systems (only one shown). A level 1 may correspond to system components, such as compute, memory, network, storage, and miscellaneous. A level 2 may correspond to any number of sockets, with only two shown as socket 0 and socket 1. A level 3 may correspond to any number of cores, with only two shown as core0 and core1. A level 4 may correspond to a physical layer and may correspond to any number of metrics, features, or characteristics for which measurement data may be obtained, such as from source devices 101, exemplified by metrics m1, m2, . . . for each of core0 and core1.

With respect to an identified anomaly, for example, telemetry policies to access measurement data or metrics may be generated hierarchically by data collector agent module 205 or by server 115. For example, initial telemetry policies may relate to measurement data or metrics relating to top level (e.g., level0) for quick inspections. Modified telemetry policies may be directed further down the hierarchy, progressively, to focus on certain subsystems at lower hierarchical levels for in-depth analysis such as, for example, as a "drill-down" on a particular subsystem (e.g., CPU, memory, network or storage). Upon improvement or correction of the source or cause of the anomalous measurement data, telemetry policies may be generated by data collector agent module 205 or by server 115 to return lower-resolution measurement data that relate to higher hierarchical levels.

EXAMPLES

Some non-limiting examples are provided below.

Example 1 may include a device for telemetry adaptation, comprising: one or more processors; a first connection interface to connect to plural measurement sources and a second connection interface to connect to one or more servers of a monitoring system; a data collector agent module to be operated by at least one of the one or more processors to receive measurement data from the plurality of measurement sources according to an initial telemetry policy and to provide the measurement data to the one or more servers of the monitoring system; an anomaly detection module to be operated by at least one of the one or more processors to receive measurement data from the data collector agent module, to detect an anomaly in the measurement data, and to provide an indication of the anomaly to the data collector agent module for the data collector agent module to provide a first modified telemetry policy to receive measurement data from the plurality of measurement sources according to the first modified telemetry policy.

Example 2 may include the device of example 1 wherein the data collector agent module further is to provide to the server a request for an analysis of the anomaly to identify a cause of the anomaly.

Example 3 may include the device of example 2 wherein the request for an analysis of the anomaly includes a request for a root cause analysis of the anomaly.

Example 4 may include the device of any of examples 1-3 wherein the data collector agent module further is to receive from the server a second modified telemetry policy to receive measurement data from the plural measurement sources according to the second modified telemetry policy and to provide to the server the measurement data received from the plurality of measurement sources according to the second modified telemetry policy.

Example 5 may include the device of any of examples 1-3 wherein the first modified telemetry policy includes the data collector agent module receiving more measurement data than the data collector agent module receives according to the initial telemetry policy.

Example 6 may include the device of any of examples 1-3 wherein the data collector agent module further is to receive the initial telemetry policy from the server.

Example 7 may include the device of any of examples 1-3 wherein the plurality of measurement sources includes a network of sensors.

Example 8 may include the device of any of examples 1-3 wherein the data collector agent module is to provide the measurement data to the one or more servers of the monitoring system as raw data.

Example 9 may include the device of any of examples 1-3 wherein the data collector agent module is to provide the measurement data to the one or more servers of the monitoring system as a pre-processed summary of the measurement data.

Example 10 may include a method for telemetry adaptation, comprising: receiving, at a networking device of a system, measurement data from a plurality of measurement sources according to an initial telemetry policy; providing, at the networking device, the measurement data to one or more servers of the system; detecting, at the networking device, an anomaly in the measurement data; and providing, at the networking device, a first modified telemetry policy to receive measurement data from the plurality of measurement sources according to the first modified telemetry policy.

Example 11 may include the method of example 10 further including providing, at the networking device, a request to the one or more servers for an analysis of the anomaly to identify a cause of the anomaly.

Example 12 may include the method of example 11 wherein the request for an analysis of the anomaly includes a request for a root cause analysis of the anomaly.

Example 13 may include the method of any of examples 11 or 12 further including: receiving, at the networking device, a second modified telemetry policy from the one or more servers according to an identified cause of the anomaly, the second modified telemetry policy being to receive measurement data from the plurality of measurement sources according to the second modified telemetry policy; and providing, at the networking device, to the one or more servers, the measurement data received from the plurality of measurement sources according to the second modified telemetry policy.

Example 14 may include the method of any of examples 10-12 wherein the first modified telemetry policy includes receiving more measurement data than according to the initial telemetry policy.

Example 15 may include the method of any of examples 10-12 wherein providing, at the networking device, the measurement data to one or more servers includes providing the measurement data as raw data.

Example 16 may include the method of any of examples 10-12 wherein providing, at the networking device, the measurement data to one or more servers includes providing the measurement data as a pre-processed summary of the measurement data.

Example 17 may include the method of any of examples 10-12 wherein the plurality of measurement sources have a hierarchical structure and the method further includes providing successively, at the networking device, plural other modified telemetry policies according to the hierarchical structure of the measurement sources to receive measurement data from the plurality of measurement sources according to the plural other modified telemetry policies.

Example 18 may include the method of any of examples 10-12 wherein the networking device is an edge device of a network.

Example 19 may include at least one non-transitory computer-readable medium including instructions to cause a networking device, in response to execution of the instructions by the networking device, to: receive, at the networking device, measurement data from a plurality of measurement sources according to an initial telemetry policy; provide, at the networking device, the measurement data to one or more servers; detect, at the networking device, an anomaly in the measurement data; and provide, at the networking device, a first modified telemetry policy to receive measurement data from the plurality of measurement sources according to the first modified telemetry policy.

Example 20 may include the at least one non-transitory computer-readable medium of example 19 further including instructions to provide at the networking device a request to the one or more servers for an analysis of the anomaly to identify a cause of the anomaly.

Example 21 may include the at least one non-transitory computer-readable medium of example 20 further including instructions to: receive, at the networking device, a second modified telemetry policy from the one or more servers according to an identified cause of the anomaly, the second modified telemetry policy being to receive measurement data from the plurality of measurement sources according to the second modified telemetry policy; and provide, at the networking device, to the one or more servers, the measurement data received from the plurality of measurement sources according to the second modified telemetry policy.

Example 22 may include the at least one non-transitory computer-readable medium of any of examples 19-21 wherein the instructions to provide, at the networking device, the measurement data to one or more servers includes instructions to provide the measurement data as raw data.

Example 23 may include the at least one non-transitory computer-readable medium of any of examples 19-21 wherein the instructions to provide, at the networking device, the measurement data to one or more servers includes instructions to provide the measurement data as a pre-processed summary of the measurement data.

Example 24 may include the at least one non-transitory computer-readable medium of any of examples 19-21 wherein the plurality of measurement sources have a hierarchical structure and the at least one non-transitory computer-readable medium further includes instructions to provide, successively, plural other modified telemetry policies according to the hierarchical structure of the measurement sources to receive measurement data from the plurality of measurement sources according to the plural other modified telemetry policies.

Example 25 may include an apparatus for telemetry adaptation, comprising: means for receiving measurement data from a plurality of measurement sources according to an initial telemetry policy; means for providing the measurement data to one or more servers; means for detecting an anomaly in the measurement data; and means for providing a first modified telemetry policy to receive measurement data from the plurality of measurement sources according to the first modified telemetry policy.

Example 26 may include the apparatus of example 25 further including means for providing a request to the one or more servers for an analysis of the anomaly to identify a cause of the anomaly.

Example 27 may include the apparatus of example 26 further including: means for receiving a second modified telemetry policy from the one or more servers according to an identified cause of the anomaly, the second modified telemetry policy being to receive measurement data from the plurality of measurement sources according to the second modified telemetry policy; and means for providing to the one or more servers the measurement data received from the plurality of measurement sources according to the second modified telemetry policy.

Example 28 may include the apparatus of any of examples 25-27 wherein the first modified telemetry policy includes receiving more measurement data than according to the initial telemetry policy.

Example 29 may include the apparatus of any of examples 25-27 wherein the means for providing the measurement data to one or more servers provides the measurement data as raw data.

Example 30 may include the apparatus of any of examples 25-27 wherein the means for providing the measurement data to one or more servers provides the measurement data as a pre-processed summary of the measurement data.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed:

1. A device for telemetry adaptation, comprising:
one or more processors;
a first connection interface to connect to a plurality of measurement sources and a second connection interface to connect to one or more servers of a monitoring system;
a data collector agent module to be operated by at least one of the one or more processors to receive measurement data from the plurality of measurement sources according to an initial telemetry policy and to provide the measurement data to the one or more servers of the monitoring system;
an anomaly detection module to be operated by at least one of the one or more processors to receive measurement data from the data collector agent module, to detect an anomaly in the measurement data, and to provide an indication of the anomaly to the data collector agent module for the data collector agent module to provide a first modified telemetry policy to receive measurement data from the plurality of measurement sources according to the first modified telemetry policy.

2. The device of claim 1 wherein the data collector agent module further is to provide to the server a request for an analysis of the anomaly to identify a cause of the anomaly.

3. The device of claim 2 wherein the request for an analysis of the anomaly includes a request for a root cause analysis of the anomaly.

4. The device of claim 1 wherein the data collector agent module further is to receive from the server a second modified telemetry policy to receive measurement data from the plurality of measurement sources according to the second modified telemetry policy and to provide to the server the measurement data received from the plurality of measurement sources according to the second modified telemetry policy.

5. The device of claim 1 wherein the first modified telemetry policy includes the data collector agent module receiving more measurement data than the data collector agent module receives according to the initial telemetry policy.

6. The device of claim 1 wherein the data collector agent module further is to receive the initial telemetry policy from the server.

7. The device of claim 1 wherein the plurality of measurement sources includes a network of sensors.

8. The device of claim 1 wherein the data collector agent module is to provide the measurement data to the one or more servers of the monitoring system as raw data.

9. The device of claim 1 wherein the data collector agent module is to provide the measurement data to the one or more servers of the monitoring system as a pre-processed summary of the measurement data.

10. A method for telemetry adaptation, comprising:
receiving, at a networking device of a system, measurement data from a plurality of measurement sources according to an initial telemetry policy;
providing, at the networking device, the measurement data to one or more servers of the system;
detecting, at the networking device, an anomaly in the measurement data; and
providing, at the networking device, a first modified telemetry policy to receive measurement data from the plurality of measurement sources according to the first modified telemetry policy.

11. The method of claim 10 further including providing, at the networking device, a request to the one or more servers for an analysis of the anomaly to identify a cause of the anomaly.

12. The method of claim 11 wherein the request for an analysis of the anomaly includes a request for a root cause analysis of the anomaly.

13. The method of claim 11 further including:
receiving, at the networking device, a second modified telemetry policy from the one or more servers according to an identified cause of the anomaly, the second modified telemetry policy being to receive measurement data from the plurality of measurement sources according to the second modified telemetry policy; and
providing, at the networking device, to the one or more servers, the measurement data received from the plurality of measurement sources according to the second modified telemetry policy.

14. The method of claim 10 wherein the first modified telemetry policy includes receiving more measurement data than according to the initial telemetry policy.

15. The method of claim 10 wherein providing, at the networking device, the measurement data to one or more servers includes providing the measurement data as raw data.

16. The method of claim 10 wherein providing, at the networking device, the measurement data to one or more servers includes providing the measurement data as a pre-processed summary of the measurement data.

17. The method of claim 10 wherein the plurality of measurement sources have a hierarchical structure and the method further includes providing successively, at the networking device, plural other modified telemetry policies according to the hierarchical structure of the measurement sources to receive measurement data from the plurality of measurement sources according to the plural other modified telemetry policies.

18. The method of claim 10 wherein the networking device is an edge device of a network.

19. At least one non-transitory computer-readable medium including instructions to cause a networking device, in response to execution of the instructions by the networking device, to:
   receive, at the networking device, measurement data from a plurality of measurement sources according to an initial telemetry policy;
   provide, at the networking device, the measurement data to one or more servers;
   detect, at the networking device, an anomaly in the measurement data; and
   provide, at the networking device, a first modified telemetry policy to receive measurement data from the plurality of measurement sources according to the first modified telemetry policy.

20. The at least one non-transitory computer-readable medium of claim 19 further including instructions to provide at the networking device a request to the one or more servers for an analysis of the anomaly to identify a cause of the anomaly.

21. The at least one non-transitory computer-readable medium of claim 20 further including instructions to:
   receive, at the networking device, a second modified telemetry policy from the one or more servers according to an identified cause of the anomaly, the second modified telemetry policy being to receive measurement data from the plurality of measurement sources according to the second modified telemetry policy; and
   provide, at the networking device, to the one or more servers, the measurement data received from the plurality of measurement sources according to the second modified telemetry policy.

22. The at least one non-transitory computer-readable medium of claim 19 wherein the instructions to provide, at the networking device, the measurement data to one or more servers includes instructions to provide the measurement data as raw data.

23. The at least one non-transitory computer-readable medium of claim 19 wherein the instructions to provide, at the networking device, the measurement data to one or more servers includes instructions to provide the measurement data as a pre-processed summary of the measurement data.

24. The at least one non-transitory computer-readable medium of claim 19 wherein the plurality of measurement sources have a hierarchical structure and the at least one non-transitory computer-readable medium further includes instructions to provide, successively, plural other modified telemetry policies according to the hierarchical structure of the measurement sources to receive measurement data from the plurality of measurement sources according to the plural other modified telemetry policies.

* * * * *